United States Patent [19]

Bammel et al.

[11] Patent Number: 5,302,076

[45] Date of Patent: Apr. 12, 1994

[54] TOW VEHICLE FOR MANEUVERING OF VEHICLES

[75] Inventors: Michael Bammel; Franz-Johannes Cürten, both of Ulm, Fed. Rep. of Germany

[73] Assignee: Goldhofer Fahrzeugwerk GmbH & Co., Memmingen, Fed. Rep. of Germany

[21] Appl. No.: 732,630

[22] Filed: Jul. 19, 1991

Related U.S. Application Data

[63] Continuation of PCT/EP90/00110, Jan. 19, 1990.

[30] Foreign Application Priority Data

Jan. 20, 1989 [DE] Fed. Rep. of Germany ....... 3901650

[51] Int. Cl.$^5$ .................. B64F 1/22; B62D 49/02; B60P 3/11
[52] U.S. Cl. ................... 414/428; 414/426; 414/430
[58] Field of Search ............ 414/426, 428, 430; 244/50

[56] References Cited

U.S. PATENT DOCUMENTS

| | | | |
|---|---|---|---|
| 4,225,279 | 9/1980 | Boyer | 414/430 X |
| 4,836,734 | 6/1989 | Pollner et al. | 414/430 |
| 4,911,603 | 3/1990 | Pollner et al. | 414/428 |
| 4,911,604 | 3/1990 | Pollner et al. | 414/428 |
| 4,917,564 | 4/1990 | Pollner et al. | 414/428 |
| 4,997,331 | 3/1991 | Grinsted et al. | 414/426 X |
| 5,013,205 | 5/1991 | Schardt | 414/426 X |

FOREIGN PATENT DOCUMENTS

| | | | |
|---|---|---|---|
| 3327629 | 2/1985 | Fed. Rep. of Germany | 244/50 |
| 3521429 | 12/1986 | Fed. Rep. of Germany | 244/50 |
| 2452427 | 11/1980 | France | 244/50 |
| 88-05399 | 7/1988 | PCT Int'l Appl. | 244/50 |
| 89-08583 | 9/1989 | PCT Int'l Appl. | 414/426 |

Primary Examiner—Michael S. Huppert
Assistant Examiner—Stephen Gordon
Attorney, Agent, or Firm—Brooks & Kushman

[57] ABSTRACT

In an aircraft maneuvering tractor (1) for the maneuvering of aircraft (2) without the aid of a tractor drawbar, wherein the chassis of the tractor has a bifurcated receiving space which is provided between the wheels (3) of a wheel axle (4) and in which a retractable and extractable pulling-in device is arranged, by which the nose wheel (9) of an aircraft (2) can be gripped and pulled onto a shovel (10) which is movable relative to the chassis and which has a substantially horizontal bearing surface (11) onto which the nose wheel (9) is to be laid and a substantially vertical stop surface (12) against which the nose wheel (9) will abut, together with at least one hold down member (13) which is disposed over the shovel (10) and which is adapted to be laid from above against the nose wheel (9) and to be impinged by a holding down force. The hold down member (13) is formed substantially in the shape of an angle or an arc so that the inner side (15) of such angle or arc is turned towards the nose wheel (9). The hold down member (13) has a free end (16) and end (17). End (17) is mounted for pivotal movement about a swivel axle (19) which is substantially parallel to the axle (18) of the nose wheel (9) and which is mounted on said tractor (1), and in the neutral position the vertical distance (a) of angle (14) from the bearing surface (11) of the shovel is less than the respective diameter (D) of the nose wheel.

20 Claims, 7 Drawing Sheets

TOW VEHICLE FOR MANEUVERING OF VEHICLES

This is a continuation of PCT/EP90/00110 filed Jan. 19, 1990.

TECHNICAL FIELD

This invention relates to an aircraft maneuvering tractor for the maneuvering of aircraft without the aid of a tractor drawbar, wherein the chassis of said tractor has a bifurcated receiving space which is provided between the wheels of a wheel axle and in which a retractable and extendable pulling-in device is disposed, by means of which the nose wheel of said aircraft can be gripped and pulled onto a shovel which is movable relative to the chassis and which has a substantially horizontal bearing surface and a substantially vertical stopper surface, together with at least one holding down member which is disposed over said shovel and which is adapted to be laid down from above against said nose wheel and to be urged thereagainst by a holding down force.

BACKGROUND ART

In a known tractor of this constructional type (DE-OS 35 21 429 [=German Offenlegungsschrift-=Patent Application Files laid open to public inspection]) the holding down members are horizontal bow-shaped members which are arranged so that prior to the nose wheel receiving procedure they are adjusted to a height corresponding to the diameter of the nose wheel so that in this position they constitute positive firm stops for the nose wheel, which overlap the nose wheel from above. Yet in this case it was ascertained that a reliable clamping of the nose wheel by such rigid holding down members is not possible. This is so because during starting and pulling by the tractor it will result that due to the elasticity of the arrangement for one thing and above all because of the air-filled pneumatic tire of the nose wheel for another thing there is some self-movements may occur which may be so considerable that the nose wheel will possibly work out itself from its clamped condition.

Furthermore, from DE-OS 35 34 045 is known a tractor having arc-shaped holding down members which are mounted to be movable by journal means on levers above the shovel so that they will be laid from above onto the nose wheel so that they can follow the nose wheel during its movement on the shovel. Yet this known arrangement is mounted above the nose wheel which is being held so that this arrangement will be so high that collisions with aircraft members and in particular with the nose wheel suspension are to be feared. Apart from this, the blocking of the holding down members takes place hydraulically so that they will merely constitute a rigid stop.

The problem underlying this invention is seen in providing a tractor of the constructional type mentioned in the first paragraph hereinabove, which has a holding down member by means of which a perfect fixing of the nose wheel onto the shovel can be achieved without endangering the aircraft members arranged above the nose wheel.

SUMMARY OF THE INVENTION

In accordance with the present invention, the above problem is solved in that the holding down member is formed substantially in the shape of an angle or an arc having a free end and an end held by holding means, (herein sometimes referred to as the held end) in that said held end is mounted for pivotal movement about a swivel axle which is substantially parallel to the axle of the nose wheel, in that the inner side of the holding down member is turned towards the nose wheel, and in that in the neutral position the vertical distance of the holding down member from the bearing surface of the shovel is less than the diameter of the nose wheel.

This embodiment and further developments permits that the nose wheel pulled by the pulling-in device onto the shovel will abut the free end of the angle and will swing this angle about the axis thereof until the nose wheel comes under the leg belonging to the free end of the angle and subsequently abuts the stopper surface of the shovel. The holding down force results from a torque exerted onto the angle about its swivel axis. For this purpose, a fluid/piston/cylinder unit may be provided which at one end is linked to the tractor and specifically to the shovel and which at the other end is linked to said held end of the angle, preferably to a lever attachment provided within the range of the swivel axle especially for the engagement of the fluid/piston/cylinder unit. In accordance with a preferred exemplary embodiment, the swivel axle is arranged on the shovel of the tractor and therefore the angle can follow each movement of the shovel and join in each movement of the shovel irrespective of the fact as to whether or not a nose wheel had already been received by the shovel.

It stands to reason that two or more angles may be arranged side by side and substantially parallel to each other on the swivel axle so that they may conjointly constitute the holding down member. For the sake of an adaptation to nose wheels having double pneumatic tires as is generally used for larger aircraft there are suitably used two angles as holding down members. They can, by way of example, be secured to a common hub.

Already prior to application of the holding down force the angle or respectively the angles may be biased or pretensioned by means of a tension spring or the like towards the nose wheel in the direction of swinging so that whenever a nose wheel is absent the angles will automatically come into the normal position or position of rest, from which the angles then can be swung upwards by a nose wheel. It is to be understood that this upward swinging movement takes place only so far away as is required dependent upon the diameter of the nose wheel. Whence it follows that no collision need be feared between the free end or free ends of the angle or the angles and parts or members of the aircraft, which are arranged above the nose wheel, for example the telescopic leg or strut of the nose wheel.

In accordance with a further exemplary embodiment of the invention the swivel axle is arranged on the tractor or specifically on the shovel so as to be displaceable in the vertical direction, wherefrom an additional adaptability to larger diameters of the nose wheels is resulting. Suitably, for the displacement of the swivel axle and thus of the angle or the angles at least one fluid/piston/cylinder unit is provided, which on one side is linked to the tractor or specifically to the shovel and which on the other side is linked to the angle or the angles above the swivel axle in spaced apart relationship with the latter, while at the same time the fluid/piston/cylinder unit(s) is provided or are provided also for the generation of the holding down force.

In order to assure that when the swivel axle and thus the angle or the angles are lifted a swinging of the same will simultaneously result under the action of the nose wheel in the direction of movement thereof during the running of the nose wheel on to the shovel, one or more levers can suitably be arranged between the tractor and respectively the shovel and the angle or angles at a point or at points of the same which are arranged in spaced apart relationship with the swivel axle so that by this lever or by these levers the swivel movement of the angle or the angles can be produced during the displacement of the swivel axle. According to a preferred exemplary embodiment, at the same time for each lever at the side of the bearing surface of the shovel that is remote from the nose wheel at least one support is arranged, which is standing out from the shovel and to which a respective end of such lever is linked, while the respective other end of a lever is linked to the angle so remote from the swivel axle that whenever the angle is in its lowered position each respective lever will be disposed in a substantially horizontal position. At the same time, this lowered position of the angle does, as a rule, correspond to the aforementioned normal position or specifically position of rest.

At the held end of each angle and thus at the swivel axle there each time is provided at least one roller which engages into a substantially vertical roller guideway, and this roller guideway is suitably arranged within the range of the vertical stopper surface of the shovel, advantageously an the back side thereof. As a roller guideway, for each roller used a U-shaped profile may be utilized.

As already elucidated, whenever the nose wheel has been pulled upwards and onto the shovel, the nose wheel will abut the free end or free ends of the angle or angles. In order to decrease the friction which results at this time, a roller rolling down on the tread of the nose wheel can be provided at the free end of an angle. During the further swinging of the angle in the course of the rolling-up of the nose wheel onto the shovel under the influence of the pulling-in device the roller will then finally be lifted from the tread of the nose wheel. Subsequently the tread slides on the angle leg region which is arranged after the roller until the nose wheel abuts the stopper surface of the shovel, whereupon the holding down force is applied. At the same time, then a trapping of the nose wheel results between the angle or angles of the holding down members, the stopper surface of the shovel, the bearing surface of the shovel and the pulling-in device lying at the back side of the nose wheel.

BRIEF DESCRIPTION OF THE DRAWINGS

The invention and the advantageous further developments and practical embodiments thereof are elucidated hereinafter in greater detail in the light of exemplary embodiments represented in the drawings, wherein.

BEST MODE FOR CARRYING OUT THE INVENTION

Figure 1:
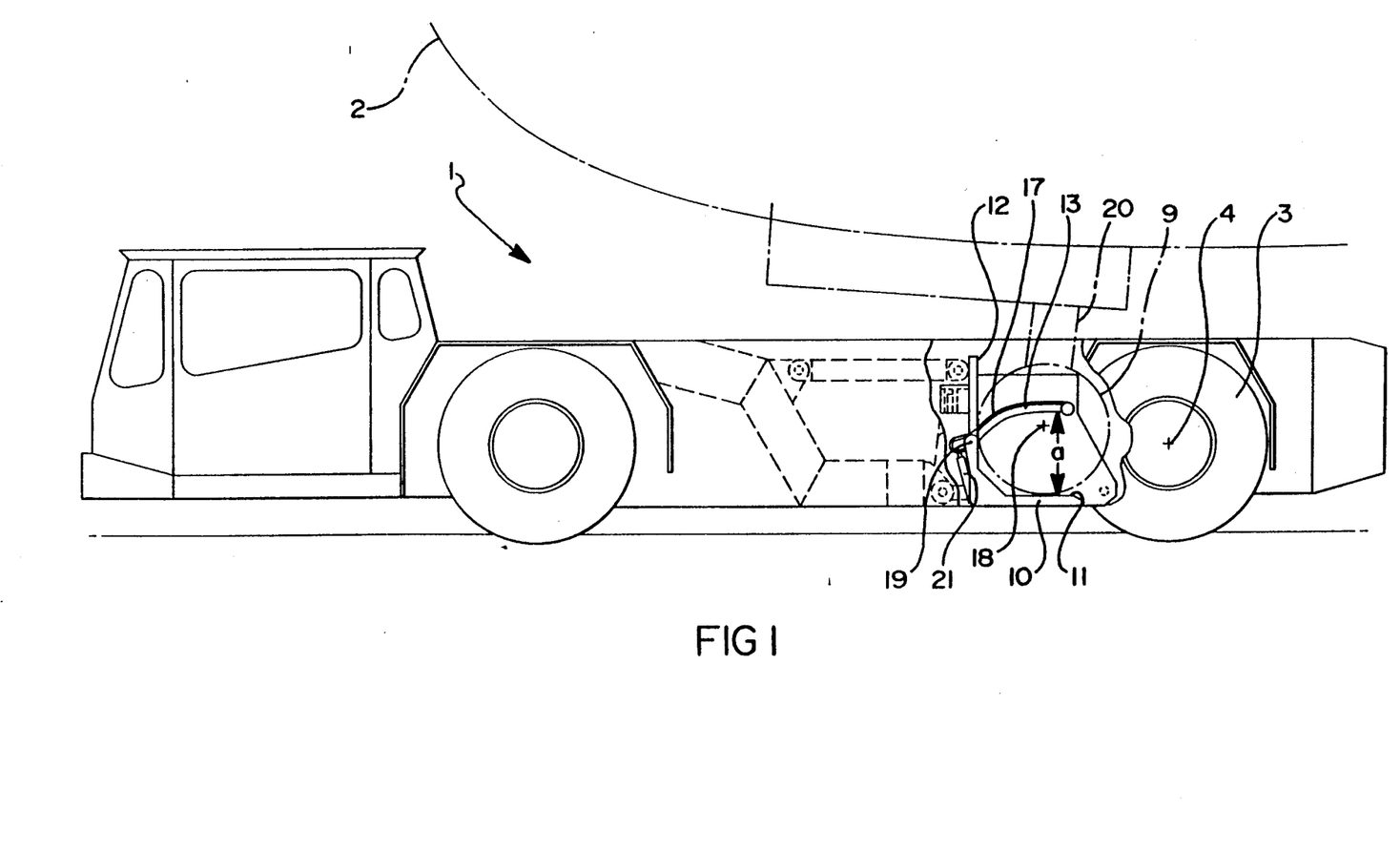
FIG. 1 shows a tractor of the above-mentioned constructional type along with a holding down member according to the present invention.
Figure 2:
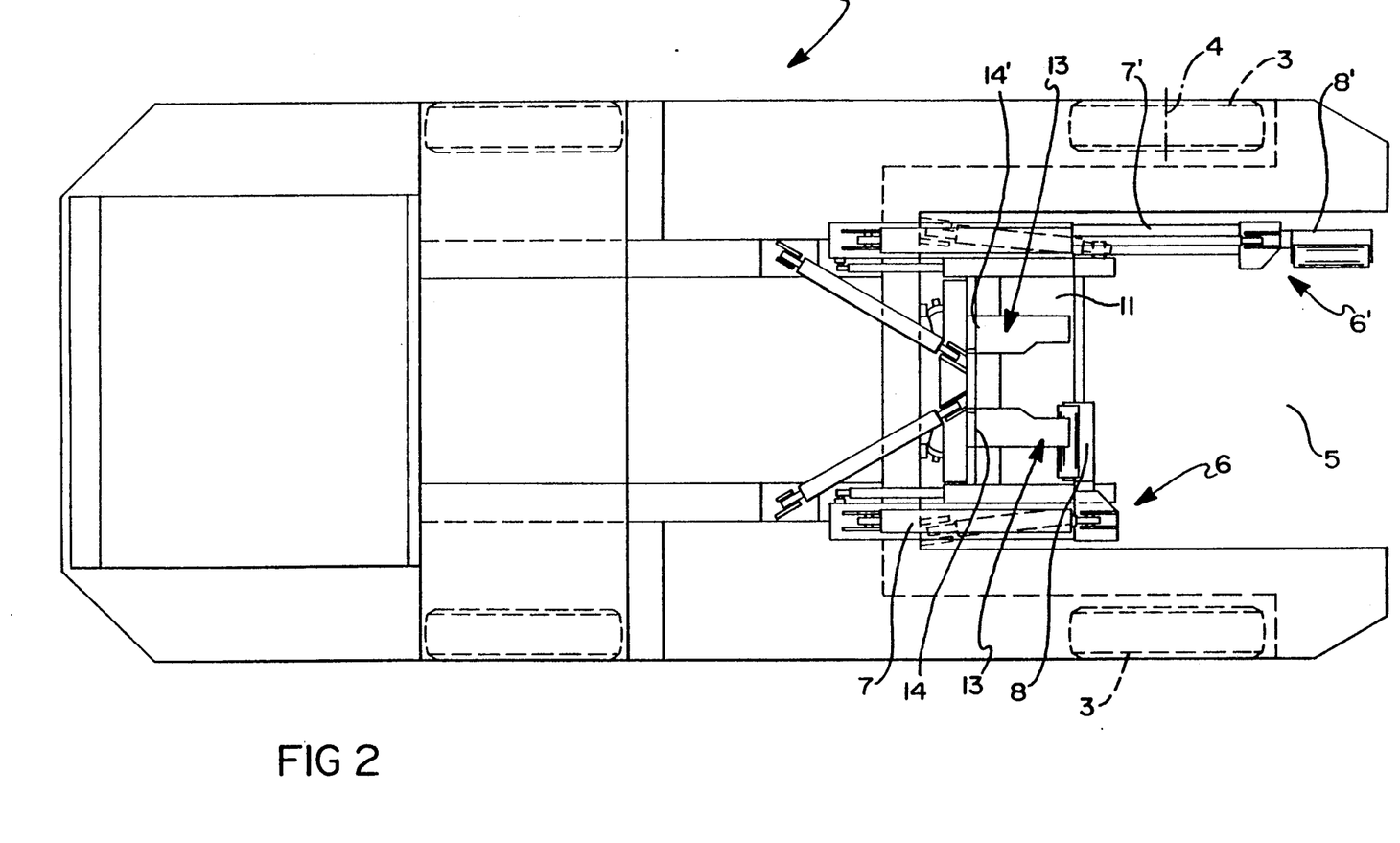
FIG. 2 shows a top plan view of the tractor according to FIG. 1.
Figure 3:
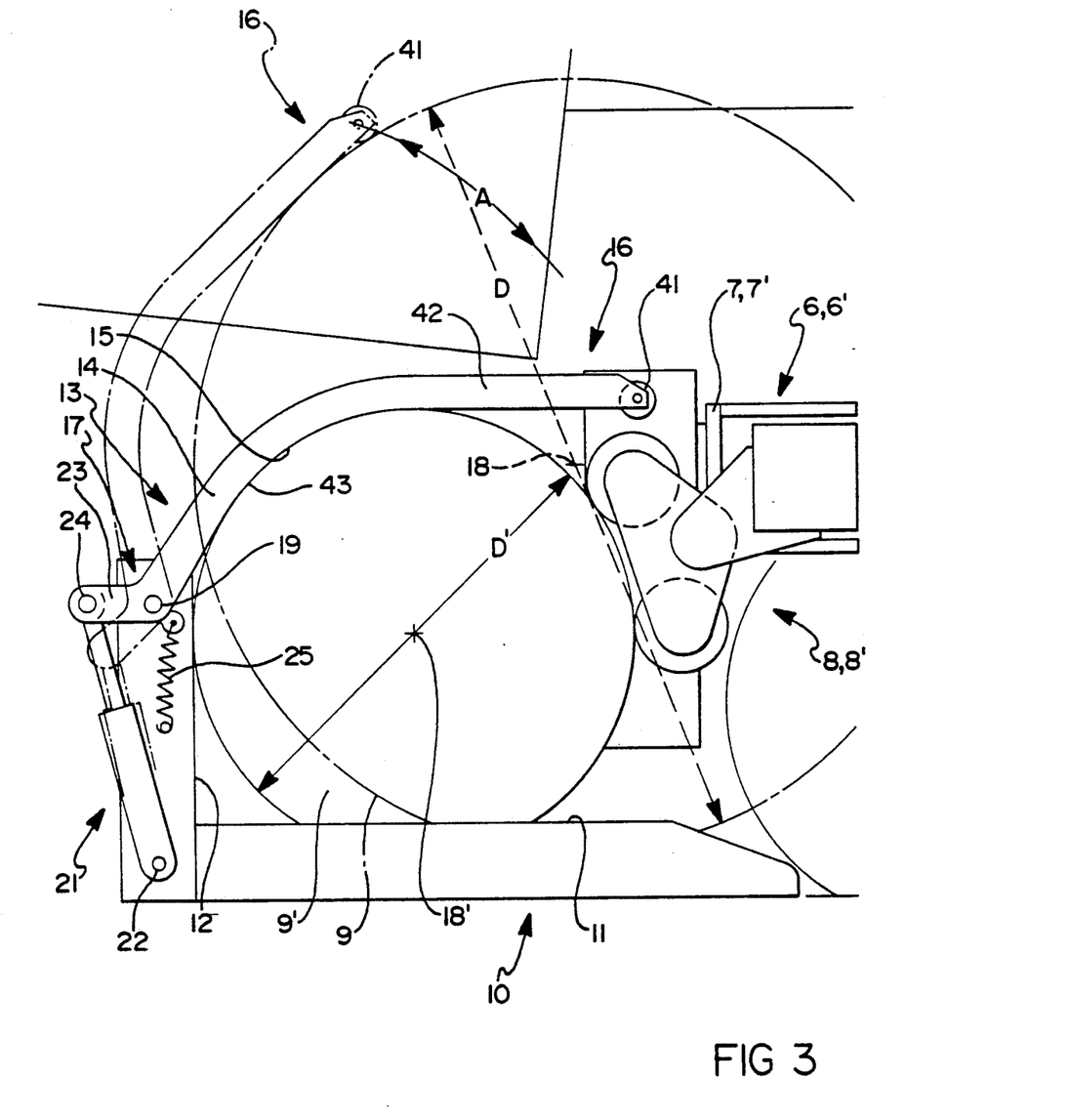
FIG. 3 shows a first practical embodiment of the holding down member according to FIG. 1 on an enlarged scale.

A first practical embodiment of the invention will first of all be elucidated in the light of FIGS. 1 to 3, of which FIGS. 1 and 2 show a tractor for the maneuvering of aircraft without the aid of a tractor drawbar. In FIG. 1 the profile of an aircraft 2 is section-wise shown by marking in dot-and-dash pattern. Between the wheels 3 of the rear wheel axle 4 the chassis of this tractor 1 has a bifurcated receiving space 5 in which a retractable and extendable pulling-in device is arranged, which can consist of two telescopic rods 7, 7' with grippers 8, 8'. By means of this retractable and extendable pulling-in device the nose wheel 9 of the aircraft 2 can be gripped and pulled onto a shovel 10 which is movable relative to the chassis of the tractor. This shovel has a substantially horizontal bearing surface 11 and a substantially vertical stopper surface 12 for the nose wheel 9.

Over the shovel 10 is provided an elongated holding down member 13 which can be laid from above against the nose wheel 9 shown in phantom outline in FIGS. 1 and 3, or a smaller nose wheel 9' shown in solid outline in FIG. 3, and which is urged thereagainst by a holding down force. In FIG. 1 this holding down member is shown in its neutral position, or position of rest, in which this member is located when no nose wheel 9' which is shown in FIG. 1, is resting upon the shovel 10. The sectional view shown on an enlarged scale in FIG. 3 shows a nose wheel 9' which is resting upon the shovel 10 and on the upper side of which the holding down member 13 is laid.

Now the holding down member 13 according to the present invention is elongated and formed substantially in the shape of an angle 14 or an arc the inner concave side 15 of which is turned towards the nose wheel 9 (or 9'). The angle 14 has a free end 16 and an end 17 held by holding means. Between these ends there are angularly related portions 42 and 43. The end 17 held by holding means is mounted for pivotal movement about a swivel axis 19 which is substantially parallel to the axle 18 of the nose wheel 9, or axle 18' of nose wheel 9', and which is arranged on the tractor 1. As shown in FIG. 1, in the neutral position or the position of rest of the holding down member 13, the vertical distance a of the free end 16 of the angle 14 from the bearing surface 11 of the shovel 10 is less than each respective diameter D or D' of the nose wheel 9 or 9' (FIG. 3).

In the practical embodiment shown, the angle 14 is rounded and crescent shaped like a boomerang or arc-shaped which represents a particularly good adaptation to the circumferential extent of the nose wheel 9 or 9'.

The swivel axis 19 is preferably arranged on the shovel 10 of the tractor. As is apparent from FIG. 3, this practical embodiment has the advantage consisting in that the holding down member 13 can directly follow each movement of the shovel 10 during the receiving and moving of the nose wheel 9 or 9' for example during the lifting and tilting and is, so to speak, formed of one piece integrally with the shovel 10. Moreover, also the retractable and extendable pulling-in device 6, 6' with the grippers 8, 8' is connected to the shovel 10 and follows the movements of the latter during the receiving and transport of the nose wheel 9 or 9', as shown in FIG. 3.

As is evident from FIG. 2, two or more holding-down members or angles 14 and 14' can be mounted on the swivel axle 19 or axis so as to be substantially parallel to each other and to be located side by side so that they will conjointly constitute the holding down member 13. In the exemplary embodiment shown in the drawings there are provided two angles or arcs 14 which in addition can be secured to a common hub (not shown in the drawings). Two angles 14 or arcs are advantageous for example when they are arranged for holding down a double-tire undercarriage of the nose wheel so that in such a case they enclose the nose wheel support 20 between themselves, said nose wheel support 20 being marked in dot-and-dash pattern in FIG. 1.

For the generation and application of the holding down force in the exemplary embodiment shown in the drawings there are provided two fluid/piston/cylinder units 21 which on one hand are linked to the shovel 10 and which on the other hand are linked to said end 17 (held by holding means) of the arc 14. In FIGS. 1 and 3 merely one single fluid/piston/cylinder unit 12 is shown in each Figure, wherein one end of said unit is linked to an axle bolt 22 at the shovel 10. The end 17 held by holding means does, within the range of the swivel axle 19, comprise a lever attachment 23 for the engagement of the other end of the fluid/piston/cylinder unit 21 with an axle bolt 24. The angle or arc 14 is furthermore biased by means of a tension spring 25 in the swinging direction (double arrow A in FIG. 3) towards the nose wheel 9 or 9'.

A second practical embodiment of the invention is elucidated in FIGS. 4 to 8, wherein parts similar to those of FIGS. 1-3 have the same reference numbers but in a 100 series. The two parallel angles 114 or arcs provided side by side are involved with mixed embodiments insofar as each respective inner side 115 turned towards the nose wheel is arc-shaped, whereas the outer side is angle-shaped. This structural embodiment does not alter anything in the basic angle shape of the holding down member 113, previously described.

Figure 4:
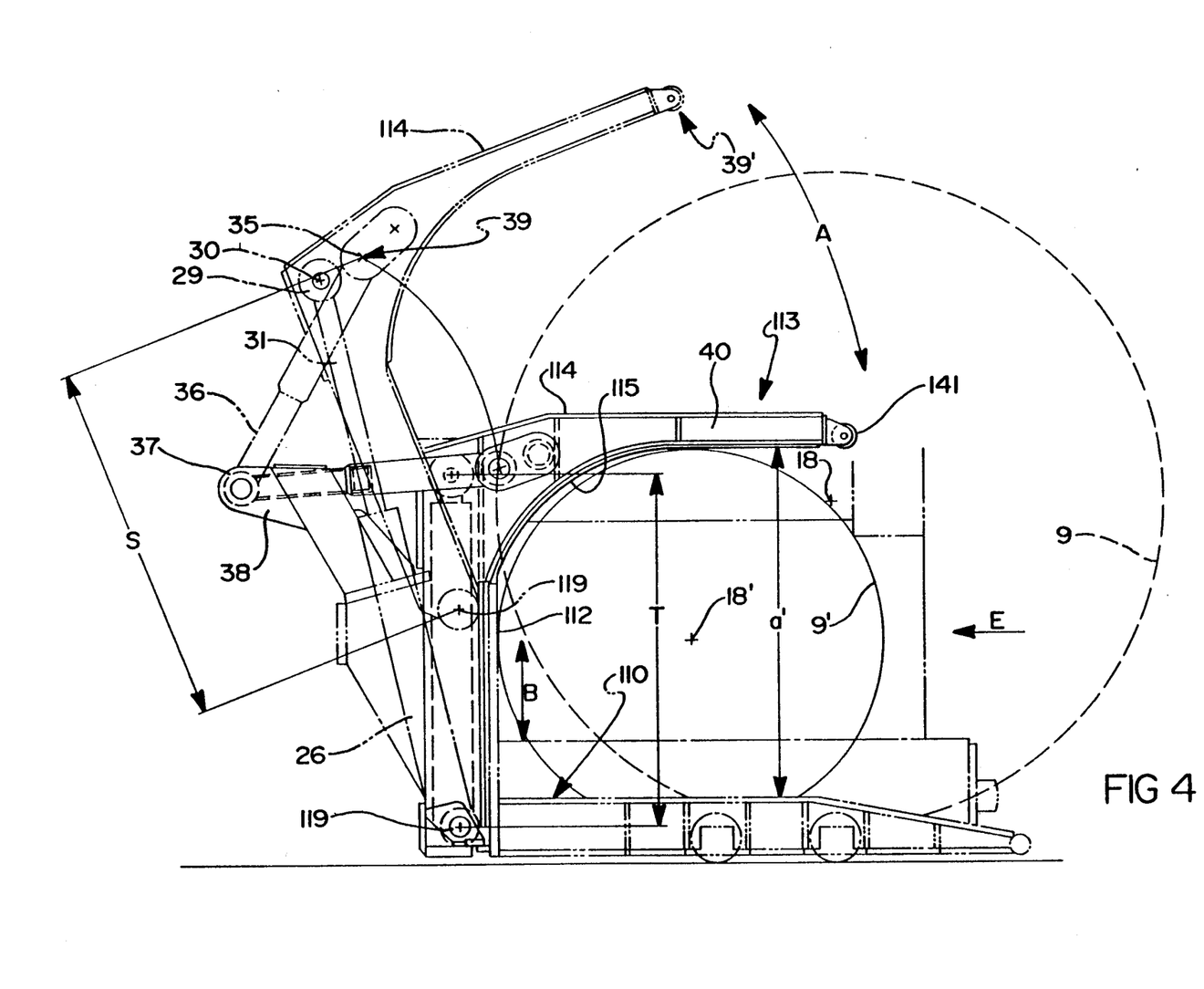
FIG. 4 shows a second practical embodiment of a holding down member.
Figure 5:
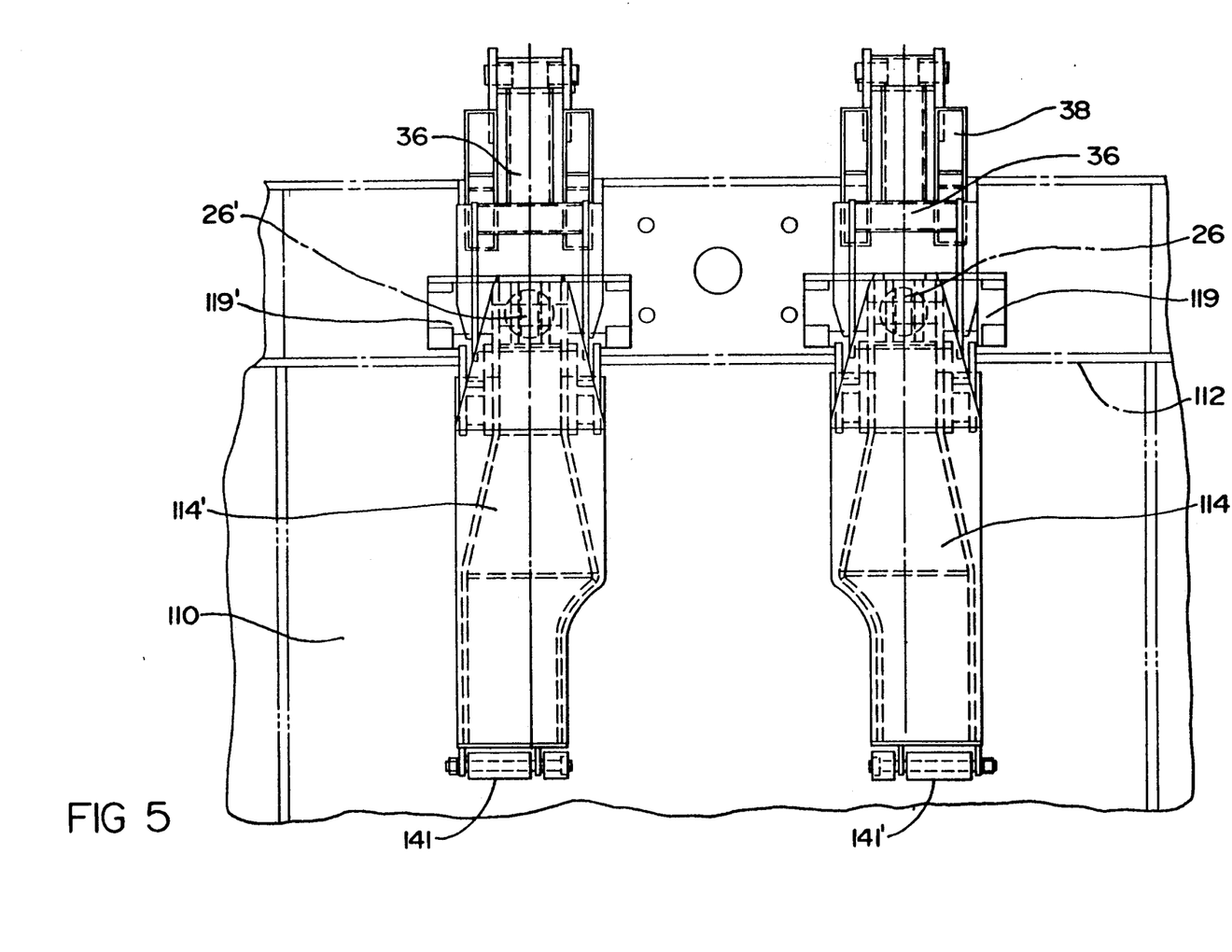
FIG. 5 shows a top plan view of the holding down member according to FIG. 4.
Figure 6:
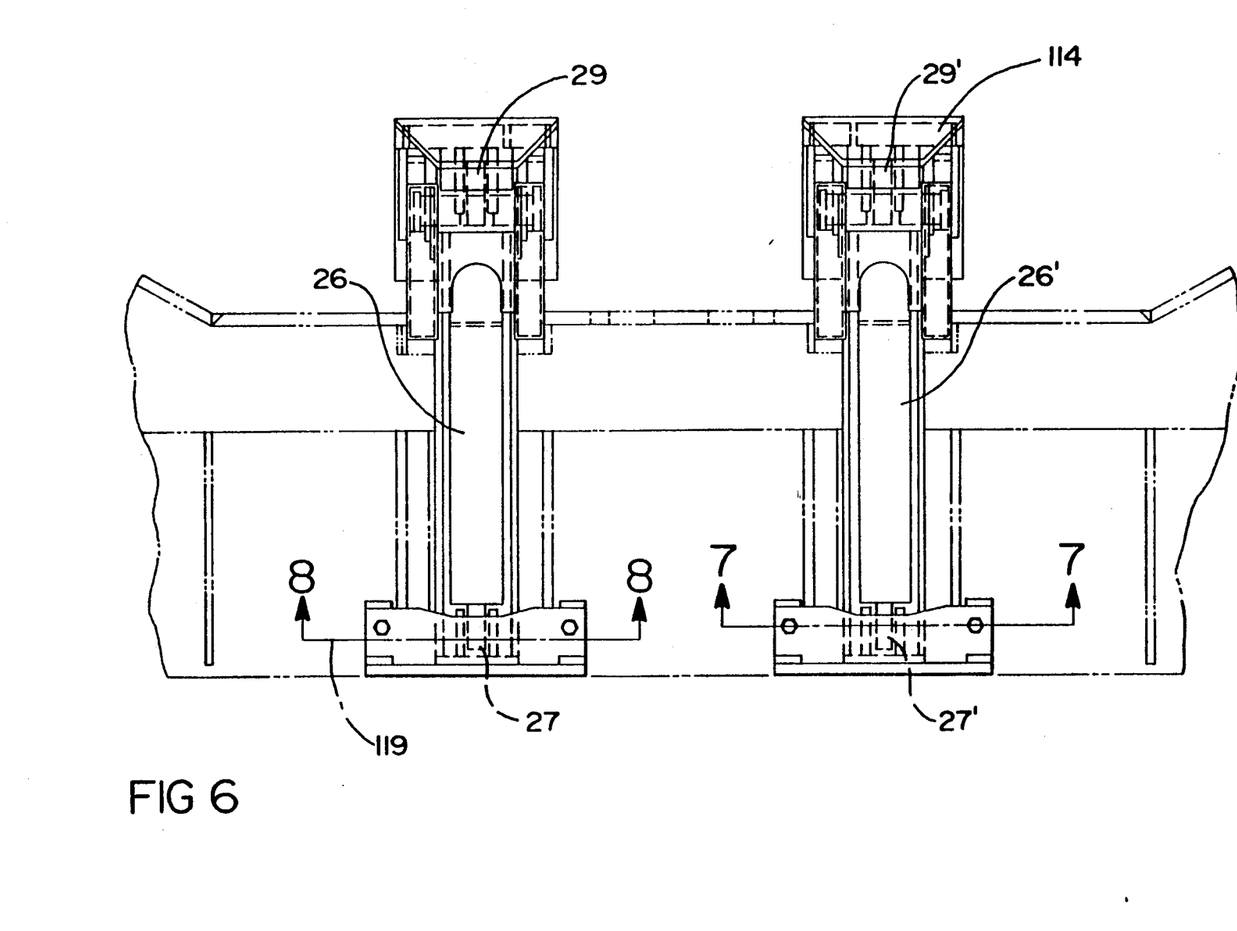
FIG. 6 shows a back view of the holding down member according to FIG. 5.
Figure 7:
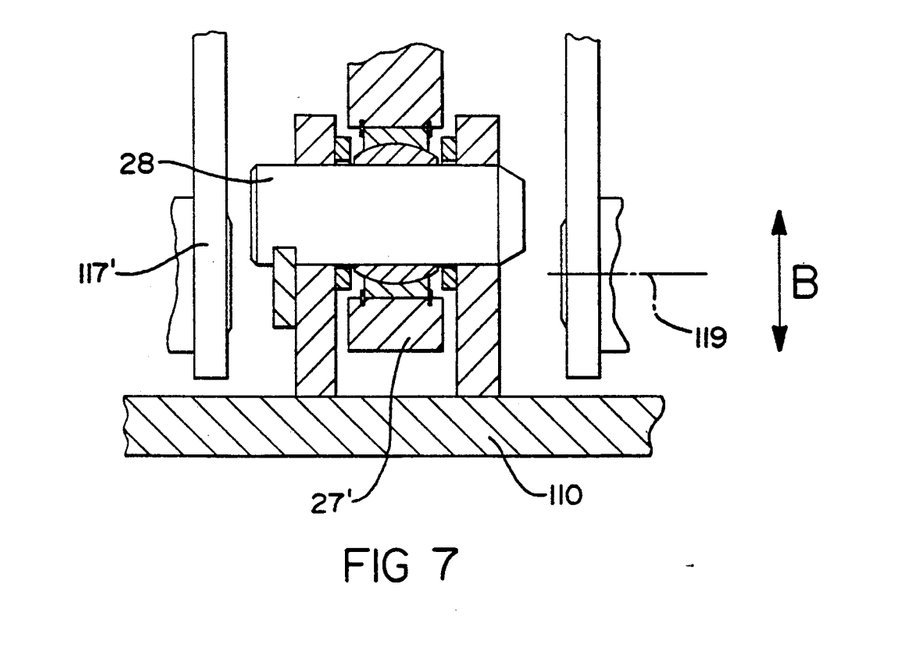
FIG. 7 shows a sectional view along the line B—B in FIG. 6.
Figure 8:
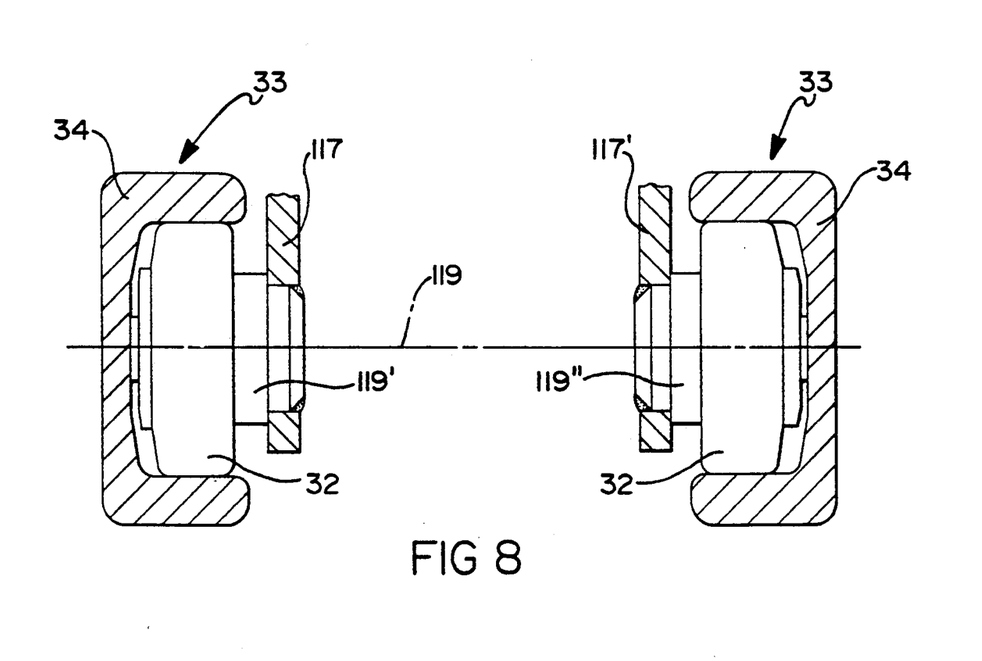
FIG. 8 shows a sectional view along the line C—C in FIG. 6.

The essential difference of this second practical embodiment relative to the first practical embodiment is evident from FIGS. 4 and 8 wherein the swivel axle 119 comprises a pair of short axles 119' and 119" shown in FIG. 8, and defining a swivel axis, having rollers 32 which are received and guided in roller guideways 33 at the tractor 1 and more particularly here at the shovel 110, and such axle 119 is displaceable so as to be guided in the vertical direction (double arrow B). In this connection, in FIG. 4 from which only one angle 114 is apparent by reason of the side view, the same is depicted by unbroken lines in its neutral position or position of rest, in which it has its lowermost or farthermost lowered position and thus the position nearest to the shovel 110 (distance a'). In the raised position in which the swivel axle 119 has its greatest distance from the shovel 110, the angle 114 is marked in dot-and-dash pattern.

For the displacement of the swivel axle 119 and thus of the angles 114 there are provided two fluid/piston/cylinder units 26, 26' which are on the one hand linked to the shovel 110 and on the other hand to the angles 114 (FIG. 4) above the respective swivel axle 119 in spaced apart relationship with the same. These fluid/piston/cylinder units 26, 26' are simultaneously provided for the generating of the holding down force. The distance T will naturally be selected so that in dependence upon the height of each respective angle 114 it should be as great as possible to thereby provide room for the arrangement of the unit 26 and 26', respectively. And the linking of the lower end 27 and 27', respectively, of each respective unit 26, 26' is effected in the manner apparent from FIGS. 6 and 7 by means of an axle bolt 28 mounted on the shovel 110. The mounting of the upper end 29 and 29', respectively, in the present case—of the end at the piston side takes place by means of an axle bolt 30 (FIG. 4) mounted at the angle 114.

It is self-evident that during the outward travel of the piston rod 31' of the fluid/piston/cylinder unit 26' the angle 114 will be raised. In order to ensure a perfect guidance of the end 117 (held by holding means) of each respective angle 114 during this raising, two rollers 32 are provided on the swivel axle 119 according to FIG. 8, which engage into a substantially vertical roller guideway 33. This roller guideway 33 is secured within the range of the vertical stopper surface 112 of the shovel 110 and it consists of U-profiles 34 which extend substantially parallel to the stopper surface 112.

Between the shovel 110 and the angle or angles 114 and 114' at respective points 35 which are arranged in a distance S from the swivel axle 119 there are provided levers 36 by which the swinging movement of the angles 114 is caused during the displacement of the swivel axle 119. This is particularly clearly apparent from FIG. 4 wherein a lever is once shown by unbroken lines and once in the raised and pivoted position in dot-and-dash pattern. The hinged mounting of the respective levers 36 at their ends 37 turned away from the angles 114 takes place at the side of the stopper surface 112 of the shovel 110 said side being turned away from the nose wheel 9—on at least one support 38 standing out from the shovel 110, while for each angle 114 and each lever 36 such a support 38 is provided. At the same time, the respectively other end 39 of each lever 36 is linked to the angle 114 in a distance from the swivel axle 119 such that the respective lever 36 in the lowered position of the respective angle 114 corresponding to the neutral position or to the position of rest is disposed in a substantially horizontal position which is apparent from the representation in FIG. 4 depicted by unbroken lines. Now whenever a nose wheel 9 or a smaller nose wheel 9' is rolling in the arrow-shown direction E on the shovel 110 or respectively whenever the nose wheel 9 is pulled by the pulling-in device 6, 6' (FIG. 1) onto the shovel 110, then, since the distance a' is less than the diameter of the nose wheel 9, the nose wheel together with its two tires will abut the ends 39' of both angles 114 and 114' and push them against these ends and it will raise them whereby the same will be swung toward a position which corresponds to the position shown by broken lines. The extent of the swinging in the direction of the double arrow A can be adapted to each respective situation and it will be in accordance with each respective selected dimension with respect to the shiftability of the swivel axle 119, the distance between the swivel axle 119 and the linking 35 of the lever 36, as well as to the length of the latter and to the arrangement of the support 38.

The control of the fluid/piston/cylinder units 26, 26' can be likewise adapted to the desired movement behavior with respect to the desired holding down force which is exerted from above upon the nose wheel 9 as soon as this nose wheel is in a position in which it abuts the stopper surface 112 on the shovel 110, as well as with respect to the flexibility during the pulling-in of the nose wheel onto the shovel 110. By way of example, the holding down member 113 and respectively the angles 114 can be permitted to carry out the outward travel already in the position represented by broken lines according to FIG. 4 before the circumferential extent of the nose wheel touches the free ends 39' of the angle 114, i.e. we can also wait until the nose wheel 9 abuts the stopper surface 112 of the shovel 110 before the free ends 39' of the angles 114 are again lowered, until the arms 40 of the same are laid on the circumferential extent of the nose wheel 9 and exert the desired holding down force onto this circumferential extent.

These embodiments hold good analogously also for the practical embodiment according to FIGS. 1 to 3, of which in FIG. 3 likewise the raised position of the free end 16 of the angle or respectively arc 14 depicted therein is marked in dot-and-dash pattern. Again, the roller 41 depicted therein can be correspondingly provided also at 141 at the end 39' in the practical embodiment according to FIGS. 4 to 8 and this roller can decrease the friction therein as far as the nose wheel 9 itself will have to effect the raising and respectively the swinging of the respective holding down member 13.

A further practical embodiment which is not shown in the drawings is such that in lieu of the lever or respectively the levers 36 it envisages second rollers which are arranged at the ends 17—held by holding means—of the angles 14 in spaced apart relationship with the swivel axle 19. In this embodiment, the roller guideways 33 are not made rectilinear but they are bent away from the nose wheel in their upper range which is turned toward the corner of the respective angle 14 so that whenever each angle 14 is raised then its swinging away from the nose wheel 9 is resulting. Hence the movement of the angle is practically the same as the movement produced by the respective lever 36 in the practical embodiment according to FIGS. 4 to 8. It is to be understood that in this case and for mechanical reasons the distance between the swivel axle 19 and the distance between the first rollers provided on this axle and the second rollers arranged above the same should be as large as possible, which is possible by a corresponding lengthening of the roller guideways upwards and especially downwards. The same practical embodiment is advantageous when possibly no room exists for the supports 38 required when the levers 36 are used.

What is claimed is:

1. An aircraft maneuvering tractor comprising, in combination:
    a bifurcated tractor chassis providing an aircraft nose wheel receiving space having an entrance end;
    a shovel movably mounted on the chassis in said space for receiving thereon and supporting an aircraft nose wheel;
    retractable and extensible nose wheel pulling means for engaging behind an aircraft nose wheel at the entrance end of said receiving space and pulling the wheel on to said shovel;
    an elongated hold down member having a pivotal axis adjacent one end and being free at the opposite end and intermediate said ends having angularly related portions providing a generally arcuate configuration for the hold down member with said free opposite end overhanging the shovel;
    means supporting said pivotal axis of the hold-down member in front of an aircraft nose wheel on said shovel; the pivotal axis supporting means and the hold down member being operable such that as the free end of the hold-down member engages the nose wheel as the nose wheel is pulled on to the shovel, the hold-down member is caused to swing upwardly about its pivotal axis so that one of said portions extends upwardly from the pivot axis in front of the nose wheel and the other of said portions extends rearwardly over the top of the nose wheel; and
    means for urging the hold-down member downwardly against a nose wheel supported on said shovel to prevent the nose wheel from lifting;
    wherein said means supporting said pivotal axis of the hold-down member is vertically linearly movable.

2. A tractor accordeing to claim 1 wherein a plurality of said hold-down members are arranged side-by-side and substantially parallel to each other on said pivotal axis and conjointly cooperate with a corresponding plurality of aircraft nose wheels on the shovel.

3. A tractor according to claim 2 wherein said means supporting said pivotal axis comprises a hub common to said plurality of hold-down members and to which the hold-down members are secured.

4. A tractor according to any one of claims 1 wherein said means for urging the hold-down member against a nose wheel on the shovel comprises at least one fluid piston-cylinder unit.

5. A tractor according to any one of claims 1 characterized in that said means for urging the hold-down member against a nose wheel on the shovel comprises at least one fluid piston-cylinder unit which is connected between said shovel and the hold-down member adjacent said pivot axis.

6. The tractor according to claim 5 wherein said hold-down member is provided with a lever adjacent said pivot axis and said fluid piston/cylinder unit is connected to said lever.

7. A tractor according to any one of claims 1 wherein spring means are provided for biasing the hold-down member about its pivotal axis toward a nose wheel on the shovel.

8. A tractor according to claim 4 wherein spring means are provided for biasing the hold-down member about its pivotal axis toward a nose wheel on the shovel.

9. A tractor according to claim 6 wherein spring means are provided for biasing the hold-down member about its pivotal axis toward a nose wheel on the shovel.

10. The tractor of claim 1 wherein said means supporting said pivotal axis of the hold-down member is mounted on the shovel and vertically moveable thereon.

11. The tractor of claim 1 wherein a fluid piston/cylinder is connected at one end to the shovel and at an opposite end to said hold-down member above the pivotal axis for raising and lowering such axis and urging the hold-down member against a nose wheel on the shovel.

12. The tractor according to claim 11 wherein link means are provided connected between the shovel and the hold-down member intermediate its length such that upon raising or lowering said pivotal axis the hold-down member is swung through an arc over the shovel and may be urged downwardly against varying diameter nose wheels on the shovel.

13. The tractor according to claim 12 wherein support means are provided on said shovel to which said link means are connected and wherein said support means are so proportioned in relation to the hold-down member and shovel that when the hold-down member is swung to its lowermost position over the shovel, the link means extend substantially horizontally.

14. The invention defined by claim 1 wherein said means supporting the pivotal axis of the hold-down member includes a substantially vertical roller guideway and said pivotal axis includes at least one roller received in said guideway.

15. The tractor defined by claim 10 wherein said means supporting the pivotal axis of the hold-down member includes a substantially vertical roller guideway and said pivotal axis includes at least one roller received in said guideway.

16. The tractor defined by claim 12 wherein said means supporting the pivotal axis of the hold-down member includes a substantially vertical roller guideway and said pivotal axis includes at least one roller received in said guideway.

17. The tractor defined by claim 13 wherein said means supporting the pivotal axis of the hold-down member includes a substantially vertical roller guideway and said pivotal axis includes at least one roller received in said guideway.

18. The tractor defined by claim 14 wherein there is a vertically extending nose wheel stopper in said space at the opposite end of the shovel from the entrance end and said vertical roller guideway extends along the wheel stopper.

19. The tractor defined in claim 18 wherein the roller guideway comprises a U-shaped profile.

20. The invention defined by claim 1 wherein the generally arcuate configuration of the hold down member has a concave side overhanging the shovel.

* * * * *

UNITED STATES PATENT AND TRADEMARK OFFICE
CERTIFICATE OF CORRECTION

PATENT NO. : 5,302,076
DATED : April 12, 1994
INVENTOR(S) : Michael Bammel, et al It is certified that error appears in the above-indentified patent and that said Letters Patent is hereby corrected as shown below:

Column 1, line 40, after "thing" delete "there is".

Column 3, line 30, after "advantageously" delete "an" and insert —on—.

Column 8, line 18, claim 2, after "tractor" delete "accordeing" and insert —according—.

Column 8, line 27, claim 4, delete "any one of claims" and insert —claim—.

Column 8, line 31, claim 5, delete "any one of claims" and insert —claim—.

Column 8, line 41, claim 7, delete "any one of claims" and insert —claim—.

Column 8, line 30, claim 4, delete "piston-cylinder" and insert —piston/cylinder—.

Column 8, line 34, claim 5, delete "piston-cylinder" and insert —piston/cylinder—.

Signed and Sealed this

Thirteenth Day of September, 1994

Attest:

BRUCE LEHMAN

Attesting Officer     Commissioner of Patents and Trademarks